C. A. TWIGGS.
LAWN SPRINKLER.
APPLICATION FILED JUNE 21, 1909.
946,888.
Patented Jan. 18, 1910.
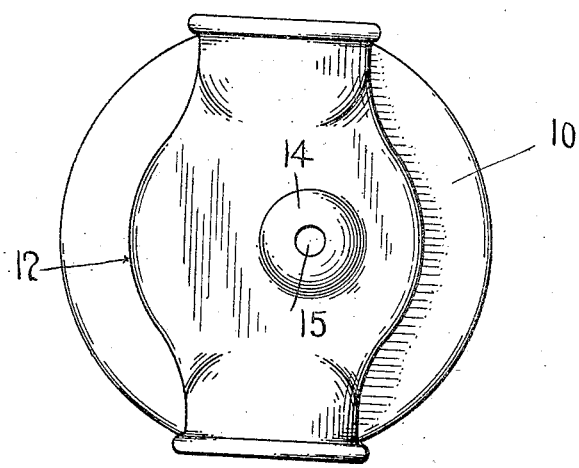
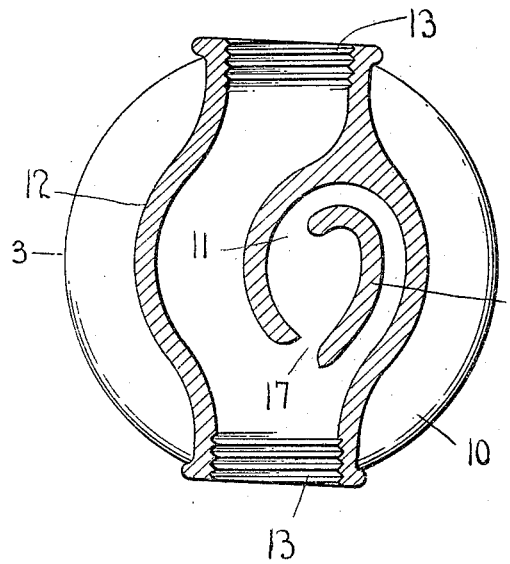
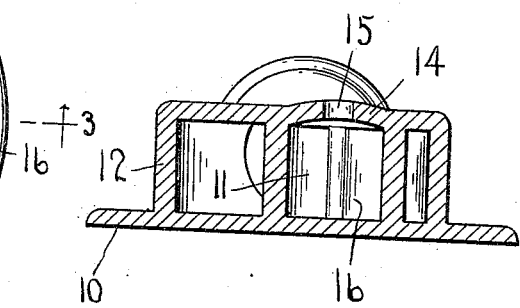
Inventor
Clifton A. Twiggs
Witnesses

UNITED STATES PATENT OFFICE.

CLIFTON A. TWIGGS, OF ZANESVILLE, OHIO.

LAWN-SPRINKLER.

946,888.

Specification of Letters Patent.   Patented Jan. 18, 1910.

Application filed June 21, 1909.   Serial No. 503,449.

*To all whom it may concern:*

Be it known that I, CLIFTON A. TWIGGS, a citizen of the United States, residing at Zanesville, in the county of Muskingum, State of Ohio, have invented certain new and useful Improvements in Lawn-Sprinklers; and I do hereby declare the following to be a full, clear, and exact description of the invention, such as will enable others skilled in the art to which it appertains to make and use the same.

This invention relates to improvements in lawn sprinklers.

The principal object of the invention is to provide a lawn sprinkler which is so constructed that a number of the sprinklers may be connected in series to a single line of hose so that this line may be run over a large lawn and the lawn sprinkled throughout at the same time.

With the above and other objects in view as will be hereinafter apparent, the invention consists in general of an improvement on the lawn sprinkler patented to one Albert L. Lambert on January 10, 1899, the patent bearing the Serial No. 617,688.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a top plan view of a lawn sprinkler constructed in accordance with this invention. Fig. 2 is a horizontal sectional view through such a lawn sprinkler. Fig. 3 is a section on the line 3—3 of Fig. 2.

The numeral 10 indicates the base of a sprinkler and on this sprinkler base is formed a chamber 11 around which extends a by-pass 12. This by-pass is threaded at each end as indicated at 13 for the purpose of connecting the same with a hose.

The chamber 11 is provided with an upwardly curved top 14 wherethrough is formed a centrally disposed escape opening 15. This chamber is furthermore provided with a baffle plate 16 and the end of this baffle plate lies adjacent one end of the by-pass 12 there being an opening 17 in the wall of the chamber which communicates with this by-pass.

In the operation of this lawn sprinkler a number of these sprinklers are connected in series along a line of hose, the water thus flowing from one to the other of the sprinklers. A portion of this flowing water is however deflected by means of the chamber 11 and baffle plate 16, and a part of this deflected water enters between the baffle plate and the side wall of the chamber while the remainder enters directly into the chamber. This sets up a whirling motion in the water in the chamber and as it escapes out of the opening 15 it is spread out in a sheet so that the ground all around the sprinkler is properly moistened. The remainder of the water, not caught by the chamber 11, passes along to the next sprinkler where in like manner a second portion is deflected into the chamber 11 and thus the operation continues from sprinkler to sprinkler, it being understood that the proportions of the passages and openings are such that a line of hose may readily supply a number of these sprinklers. Whenever it is desired to use but a single sprinkler it is merely necessary to plug one of the ends 13 with an ordinary pipe plug when the device can be used in a manner similar to that of Lambert before mentioned.

There has thus been provided a simple and efficient device of the kind described and for the purpose specified.

Having thus described the invention, what is claimed as new, is:—

1. In a lawn sprinkler, the combination with a base, of a central chamber having an escape opening and a by-pass leading around said chamber, said chamber being provided with an opening into the by-pass adjacent one end thereof.

2. In a lawn sprinkler, the combination with a base, of a central chamber having an escape opening, and a by-pass leading around said chamber, each end of the by-pass being provided with means for attaching a hose, and said chamber being provided with an opening into the by-pass adjacent one end thereof.

3. In a lawn sprinkler, the combination with a base, of a central chamber having an escape opening, a curved baffle plate in said chamber, and a by-pass leading around said chamber, said chamber being provided with an opening into the by-pass adjacent one end thereof.

4. The combination with a line of hose; of a series of sprinklers arranged in spaced relation in said hose line, each of said sprinklers including a base, a central chamber having an escape opening, and a by-pass leading around said chamber, said chamber being provided with an opening into the by-pass adjacent one end thereof and said by-pass being provided with threaded ends to connect the same in said line of hose.

In testimony whereof, I affix my signature, in presence of two witnesses.

CLIFTON A. TWIGGS.

Witnesses:
 PEARL B. FELDNER,
 H. J. HOPSTETTER.